United States Patent [19]

Mealey et al.

[11] Patent Number: 5,991,822
[45] Date of Patent: Nov. 23, 1999

[54] SYSTEM FOR MODIFYING FUNCTIONS OF STATIC DEVICE DRIVER USING A REGISTERED DRIVER EXTENSION EXTENDED DYNAMICALLY BY PROVIDING AN ENTRY POINT FOR THE DRIVER EXTENSION

[75] Inventors: Bruce Gerard Mealey, Austin; Randal Craig Swanberg, Round Rock; Michael Stephen Williams, Austin, all of Tex.

[73] Assignee: International Business Machines Corporation, Armonk, N.Y.

[21] Appl. No.: 08/820,470

[22] Filed: Mar. 17, 1997

[51] Int. Cl.⁶ ....................................................... G06F 13/10
[52] U.S. Cl. ........................ 709/301; 709/302; 709/305; 713/1; 713/2; 713/100
[58] Field of Search ..................................... 395/674, 681, 395/828, 830, 861; 709/301, 302, 305; 713/1, 2, 100

[56] References Cited

U.S. PATENT DOCUMENTS 5,752,032  5/1998  Keller et al. ............................. 395/681
5,781,798  7/1998  Beatty et al. ............................. 395/830
5,794,035  8/1998  Golub et al. ............................. 395/674

*Primary Examiner*—Thomas C. Lee
*Assistant Examiner*—Ilwoo Park
*Attorney, Agent, or Firm*—Richard A. Henkler; Jack V. Musgrove; Andrew J. Dillon

[57] ABSTRACT

A method of changing the functionality of a statically bound device driver, by dynamically extending the static device driver using a registered driver extension. The static device driver has a plurality of handlers or functions (such as input/output functions) used to control a device that is connected to or part of the computer system, and the driver extension modifies at least one of these functions, although it can be used to change several, or even all, of the functions. In the embodiment wherein the computer system is a UNIX-type workstation having a kernel residing in the memory, the static device driver is loaded in the kernel and is dynamically extended by providing at least one entry point for the driver extension.

15 Claims, 3 Drawing Sheets

SYSTEM FOR MODIFYING FUNCTIONS OF STATIC DEVICE DRIVER USING A REGISTERED DRIVER EXTENSION EXTENDED DYNAMICALLY BY PROVIDING AN ENTRY POINT FOR THE DRIVER EXTENSION

BACKGROUND OF THE INVENTION

1. Field of the Invention

The present invention generally relates to computer systems and more particularly to a method for extending static device driver functionality without requiring rebuilding of the operating system.

2. Description of the Prior Art

The basic structure of a conventional computer system 10 is shown in FIG. 1. The heart of computer system 10 is a central-processing unit (CPU) or processor 12, which is connected to several peripheral devices, including input/output (I/O) devices 14 (such as a display monitor and keyboard) for the user interface, a permanent memory device 16 (such as a hard disk or floppy diskette) for storing the computer's operating system and user programs, and a temporary memory device 18 (such as random-access memory or RAM) that is used by processor 12 to carry out program instructions. Processor 12 communicates with the peripheral devices by various means, including a bus 20 or a direct channel 22. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter connected to processor 12 might be used to control a video display monitor. Various types of device drivers (software programs) are used to control the hardware devices.

Computer system 10 also includes firmware 24 whose primary purpose is to seek out and load an operating system from one of the peripherals (usually permanent memory device 16) whenever the computer is first turned on. The process of seeking out and loading the operating system is referred to as "booting" the computer. Computer system 10 may be designed to allow firmware 24 to re-initialize an operating system without turning the computer off and back on again (a "soft" boot). Firmware 24 is essentially a series of machine instructions which are typically stored in a read-only storage (ROS) device, such as read-only memory (ROM). As shown in the flow chart of FIG. 2, after power to computer system 10 is turned on, processor 12 begins to execute the firmware instructions and seeks out an operating system (26). If an operating system is found, it is loaded (28) into temporary memory 18, including any device drivers present in the operating system image, to enable the system to communicate with appropriate hardware. Thereafter, additional device drivers may be dynamically loaded by the operating system (30), for example, if a hardware device is connected to the computer system after the boot sequence. Finally, the operating system allows other application layers to be added, i.e., user software programs (32).

The foregoing description generally applies to any type of operating system, including two popular operating systems known as MSDOS and UNIX (MSDOS is a trademark of Microsoft Corp.; UNIX is a trademark of UNIX System Laboratories), but the present invention has particular application to UNIX. UNIX is a multi-user, multi-tasking operating system which is available from a variety of sources with different versions. These include, among others, System V (American Telephone & Telegraph), AIX (International Business Machines) and Mach (NeXT Computers). FIG. 3 illustrates a typical UNIX workstation 34. Workstation 34 includes the various hardware components shown in FIG. 1, and generally represented at 36, and furthermore includes two software layers, the kernel 38 and the user application layer 40. Kernel 36 is the lowest level of the operating system and acts as the intermediary between user programs and hardware devices and includes, among other things, device drivers that interface with hardware control 42. Kernel 38 may include static device drivers 44 which are originally bound with the kernel during initialization and dynamically loaded device drivers 46 which are added to the kernel after initialization. A dynamically loaded device driver 46 can be used for a unique device or can simply be a replacement for a generic static device driver. Both types of device drivers are usually accessed by a buffering mechanism such as a device switch table 48.

Device drivers are often hardware dependent, which can present difficulties when installing or using particular hardware devices. If an appropriate device driver for a new device is not already present in the kernel, (i.e., statically bound) and if a dynamically loadable driver is not available, then the kernel must be re-bound with a new static device driver. If a dynamically loadable driver is available, then it can easily be loaded as a kernel extension but, in some cases, the system requires certain devices or hardware functions to be provided only via static device drivers bound in the kernel since the facilities they require must exist prior to the ability to load kernel extensions. These functions include, for example, NVRAM, RAMDD, and console device drivers. In these cases, the only way to enhance the functionality or capabilities of the static device driver is to rebuild the base kernel. Similarly, there is no way to modify a static device driver once it has been loaded. For example, there might be a bug (software instruction error) in the static device driver, but it cannot be fixed unless the kernel is rebuilt. It would, therefore, be desirable and advantageous to devise a method of changing the functionality of a statically bound device driver without requiring rebuilding of the kernel or otherwise rebooting the operating system.

SUMMARY OF THE INVENTION

It is therefore one object of the present invention to provide an improved method of loading device drivers for a computer system.

It is another object of the present invention to provide such a method which allows modification of a statically bound device driver.

It is yet another object of the present invention to provide such a method that provides modifications to the statically bound device driver without requiring rebuilding of the operating system.

The foregoing objects are achieved in a method for providing control of a device in a computer system, generally comprising the steps of loading a static device driver into the memory of the computer system, and thereafter dynamically extending the static device driver using a driver extension which is registered with the static device driver. The static device driver has a plurality of handlers or functions (such as input/output functions) used to control the device, and the driver extension modifies at least one of these functions, although it can be used to change several, or even all, of the functions. In the embodiment wherein the computer system is a UNIX-type workstation having a kernel residing in the memory, the static device driver is within the kernel and is dynamically extended by providing at least one entry point for the driver extension.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DESCRIPTION OF THE PREFERRED EMBODIMENT

Figure 1:
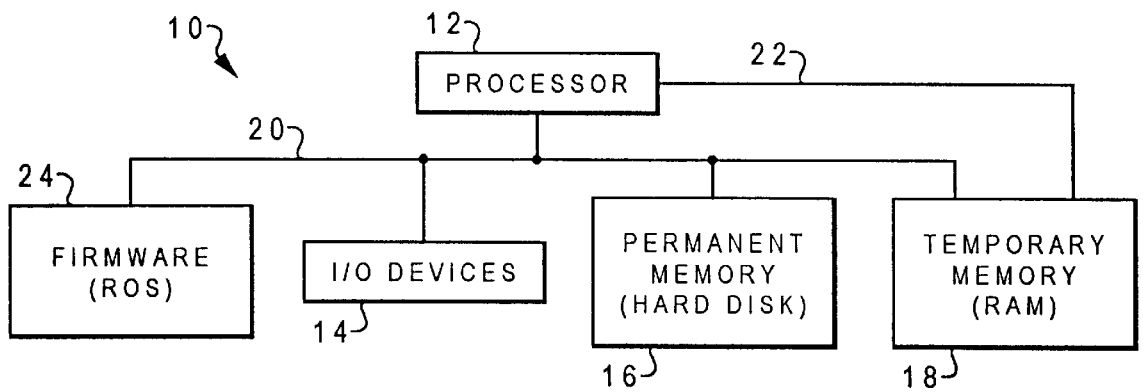
FIG. 1 is a block diagram of a prior-art computer-operating system.
Figure 2:
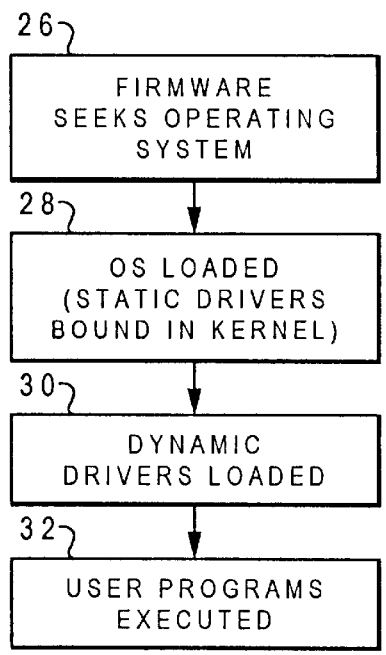
FIG. 2 is a flow chart illustrating how a computer loads a prior-art operating system with static device drivers bound to the operating system, and then loads dynamically loadable device drivers after loading the operating system.
Figure 3:
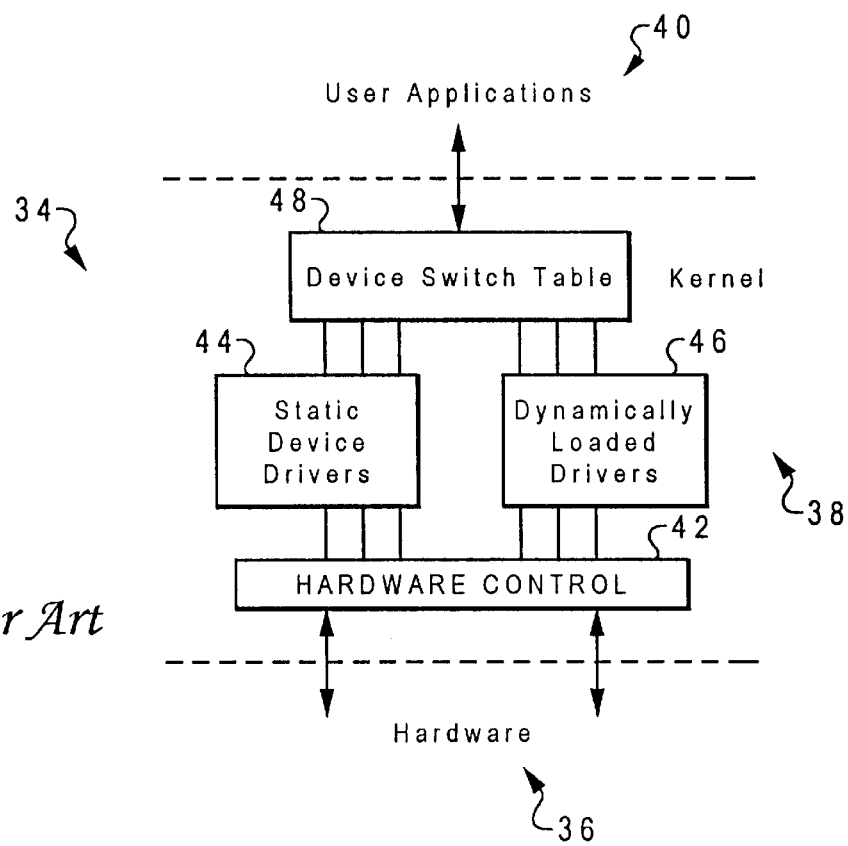
FIG. 3 is a block diagram of a prior art UNIX-type workstation having static and dynamic device drivers.
Figure 4:
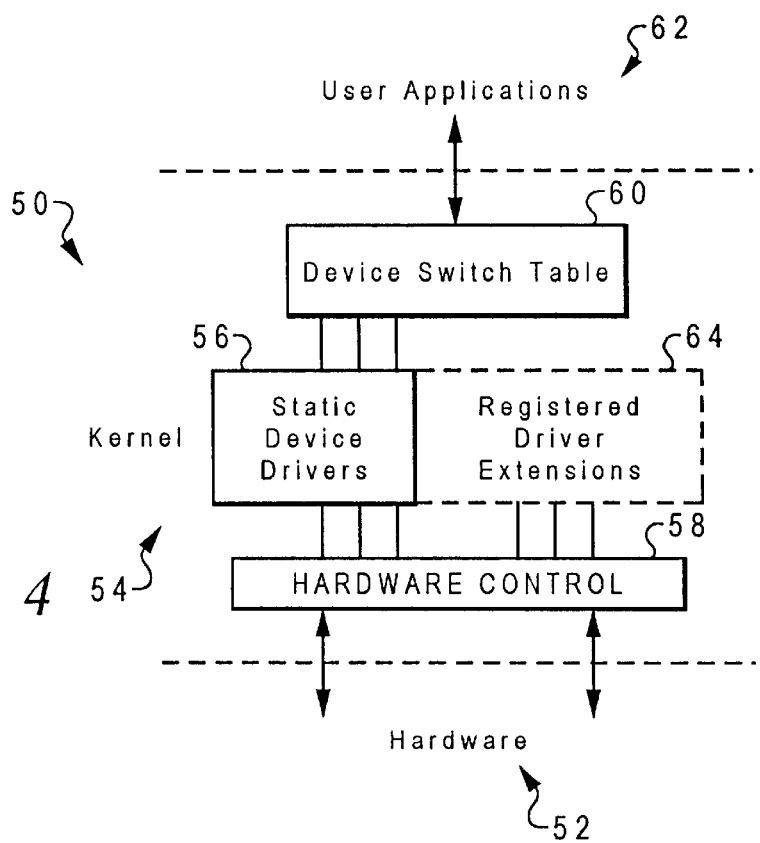
FIG. 4 is a block diagram of a UNIX-type workstation configured according to the present invention with registered driver extensions.

With reference now to the figures, and in particular with reference to FIG. 4, there is depicted one embodiment 50 of a UNIX-type workstation according to the present invention. Workstation 50 is generally comprised of the same basic hardware as shown in FIG. 1, portions of which are indicated at 52, but workstation 50 has a novel operating system loaded in kernel 54 which allows for registration of static device-driver extensions. Kernel 54 has the static device drivers 56 bound thereto, and includes conventional hardware control 58 that is connected to the outputs of the device drivers. Static device drivers 56 are accessed via a conventional-device switch table 60 that acts as an interface with the user applications 62. Kernel 54 also includes driver extensions 64 that are "registered" with static device drivers 56. The driver extensions provide control for hardware control 58, but are not accessed by the device switch table. Instead, static device drivers 56 register specific handlers or functions (like open, read, ioctl, or other I/O control functions) to provide process entry points for those functions with respect to the particular device being accessed.

This solution allows the functionality of a static device driver to be dynamically extended in order to get the flexibility of a loadable device driver in cases where static boot-time functionality is also required. One such example is that, at a later point during system initialization, a kernel extension could register its own ioctl( ) handler to be called due to an ioctl( ) call to that static device driver. This example could also be expanded to other device-driver entry points. In this manner, a user can change the function of a device driver that is statically bound without rebinding the kernel. This adaptability allows a user to enhance a device driver, e.g., provide hardware-specific differentiators, or to otherwise modify the driver, e.g., fix a bug.

Figure 5:
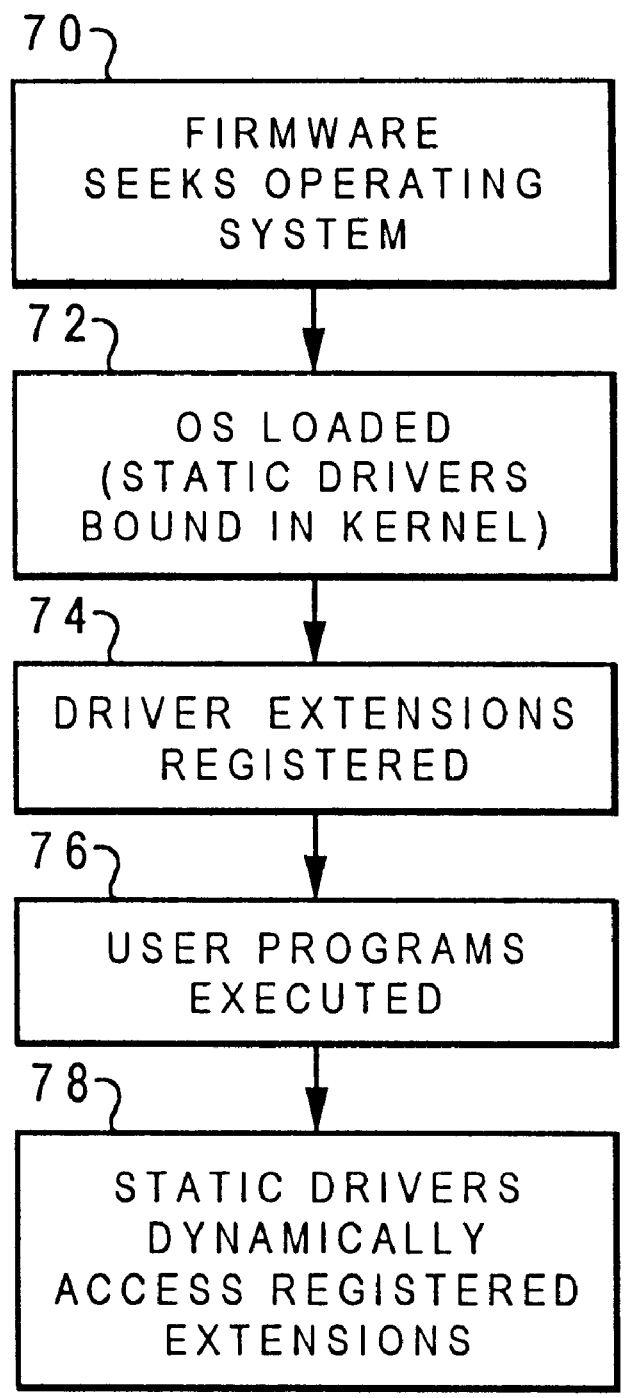
FIG. 5 is a flow chart illustrating how, according to the present invention, a computer loads an operating system with static device drivers that allow registration of driver extensions, and how the static drivers dynamically access the registered extensions.

The typical operation of a computer system using registered device extensions is shown in FIG. 5. After power to the system is turned on (or a soft-boot command is executed), the firmware searches for an operating system to load (70). The operating system is then loaded into primary memory, including any static device drivers (72). These drivers are configured to recognize extensions based on the device driver entry points (74). For example, if a static NVRAM read/write device driver entry point is called, the driver first checks to see if there are any registered extensions for that entry point and, if so, calls the registered extension. The extension can examine the offset of the NVRAM request and determine if it was in the NVRAM device that it controls. If so, the extension would service the request, but if not, it then would return control to the static driver, which would call the next registered extension or, if appropriate, handle the request itself. After the operating system has been loaded and any driver extensions have been registered, regular user programs are executed (76). Then, when any application sends a function call to a static device driver with a registered extension, the static driver re-routes the call to the extension (78). In this manner, registration allows the extension to override a particular functionality of, or add new functionality to, the static driver.

In one specific implementation of the present invention, an AIX operating system is modified to provide a machine device driver (/dev/nvram) which is a static device driver providing the base functionality required before it is possible to dynamically load further support. However, via a special extension file registered with the machine device driver, additional functions are provided that are machine-specific. This approach allows common static functions to remain in the base operating system while moving machine-specific functions to appropriate kernel extensions to be dynamically loaded and registered with the machine device driver at run-time.

Unlike dynamically loaded drivers, registered driver extensions 64 are not usually a complete driver, i.e., the extension usually modifies only a portion of the driver functionality. A registered extension could, however, completely replace all functionality for a given static driver, or two or more registered extensions could be used to override all base functionality. Those skilled in the art will appreciate that an operating system constructed in accordance with the present invention can still have dynamically loaded drivers (not shown in FIG. 4) in addition to registered driver extensions 64.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A method for providing control of a device in a computer system having memory, comprising the steps of:

loading a static device driver into the memory of the computer system, the static device driver having means for providing a plurality of functions used to control the device; and dynamically extending the static device driver using a driver extension, wherein the driver extension modifies at least one of the plurality of functions of the static device driver and the static device driver is dynamically extended by providing at least one entry point for the driver extension.

2. The method of claim 1 wherein the static device driver is dynamically extended in response to a function call from a user application.

3. The method of claim 1 wherein the static device driver is loaded as part of the further step of loading an operating system on the computer system.

4. The method of claim 1 wherein:

the computer system is a UNIX-type workstation having a kernel residing in the memory; and the static device driver is loaded in the kernel.

5. The method of claim 1 wherein the static device driver is dynamically extended by providing a registration in the static device driver for the driver extension.

6. The method of claim 1 wherein the driver extension provides a new function for controlling the device.

7. The method of claim 1 wherein the driver extension is also loaded in the memory of the computer.

8. The method of claim 1 wherein at least one function is an input/output function.

9. The method of claim 1 wherein the static device driver is dynamically extended by registering the driver extension with at least one function.

10. A computer system comprising:

a hardware device;

memory means storing a static device driver used to control said hardware device;

processor means for carrying out instructions from said static device driver to control said hardware device; and a device driver extension registered with said static device driver such that a function call issued to said hardware device is re-routed by said static device driver to said device driver extension, wherein said device driver extension modifies at least one of a plurality of functions of said static device driver and said static device driver re-routes said function call by providing an entry point for said device driver extension.

11. The computer system of claim 10 wherein:

said static device driver provides a plurality of functions for controlling said hardware device; and said static device driver re-routes a function call to said device driver extension for only one of said functions.

12. The computer system of claim 10 wherein:

said static device driver provides a plurality of functions for controlling said hardware device; and said static device driver re-routes a function call to said device driver extension for at least two of said functions.

13. The computer system of claim 10 wherein:

the computer system is a UNIX-type workstation having a kernel residing in said memory means; and said static device driver is loaded in said kernel.

14. The computer system of claim 10 wherein said device driver extension provides a new function for controlling the device.

15. The computer system of claim 13 wherein the kernel includes a hardware control unit, and said device driver extension interfaces directly with said hardware control unit.

* * * * *